US009525307B2

(12) United States Patent
Ghazarian et al.

(10) Patent No.: US 9,525,307 B2
(45) Date of Patent: Dec. 20, 2016

(54) AUTOMATIC DUAL BATTERY CHARGER MOBILE COMMUNICATION APPARATUS

(71) Applicants: Ohanes D. Ghazarian, Henderson, NV (US); Chau-Ho Chen, New Taipei (TW)

(72) Inventors: Ohanes D. Ghazarian, Henderson, NV (US); Chau-Ho Chen, New Taipei (TW)

(*) Notice: Subject to any disclaimer, the term of this patent is extended or adjusted under 35 U.S.C. 154(b) by 207 days.

(21) Appl. No.: 14/121,571

(22) Filed: Sep. 19, 2014

(65) Prior Publication Data

US 2016/0087488 A1    Mar. 24, 2016

Related U.S. Application Data

(63) Continuation-in-part of application No. 14/121,079, filed on Jul. 28, 2014, now Pat. No. 9,263,898.

(51) Int. Cl.
| | |
|---|---|
| *H02J 7/00* | (2006.01) |
| *H02J 9/06* | (2006.01) |
| *H04W 76/02* | (2009.01) |
| *H04W 64/00* | (2009.01) |

(52) U.S. Cl.
CPC .............. *H02J 9/061* (2013.01); *H02J 7/0021* (2013.01); *H02J 7/0054* (2013.01); *H04W 64/00* (2013.01); *H04W 76/02* (2013.01)

(58) Field of Classification Search
CPC .................................................. Y10T 307/313
USPC .......................................................... 307/19
See application file for complete search history.

(56) References Cited

U.S. PATENT DOCUMENTS

| | | | | |
|---|---|---|---|---|
| 5,204,610 | A * | 4/1993 | Pierson ................... | H02J 9/061 307/66 |
| 5,825,100 | A * | 10/1998 | Kim ........................ | G06F 1/263 307/150 |
| 5,867,007 | A * | 2/1999 | Kim ....................... | H02J 7/0024 320/118 |
| 6,081,096 | A * | 6/2000 | Barkat ..................... | G06F 1/26 320/124 |
| 6,118,250 | A * | 9/2000 | Hutchison, IV ....... | H02J 7/0024 320/110 |
| 6,184,659 | B1 * | 2/2001 | Darmawaskita ...... | H02J 7/0052 320/137 |
| 7,804,412 | B2 * | 9/2010 | Derrick ................. | G01S 5/0054 340/539.13 |
| 8,643,334 | B2 * | 2/2014 | Kuo ....................... | H02J 7/0018 320/116 |
| 9,263,898 | B1 * | 2/2016 | Ghazarian ............. | H02J 7/0019 |

(Continued)

*Primary Examiner* — Rexford Barnie
*Assistant Examiner* — Joseph Inge
(74) *Attorney, Agent, or Firm* — LeonardPatel PC

(57) ABSTRACT

A mobile communication apparatus utilizes a first and a second internal battery to provide power to the apparatus' electronic circuitry. A detachable battery may charge the first internal battery, and the first internal battery may provide power the electronic circuitry and charge the second internal battery. When the first internal battery is being charged by the detachable battery, the apparatus is operative by the power from the second internal battery. And, when the second internal battery is being charged by the first internal battery, the apparatus becomes operative by the power from first internal battery. The apparatus further may include a positioning locator receiver used to determine the location of the apparatus, and may be securely attached with a tamper detection circuitry to a person or a subject to be monitored.

9 Claims, 8 Drawing Sheets

(56) References Cited

U.S. PATENT DOCUMENTS

2008/0012760 A1* 1/2008 Derrick .................... G07C 1/20
                                                    342/357.74
2008/0238356 A1* 10/2008 Batson .................. H02J 7/0045
                                                      320/103

* cited by examiner

AUTOMATIC DUAL BATTERY CHARGER MOBILE COMMUNICATION APPARATUS

BACKGROUND OF THE INVENTION

There are many battery charging methods used for portable or user carry on electronic communication devices. Commonly known system includes mobile phones or note book PC, note pads, tracking apparatuses or other portable electronic devices. The mobile communication device contains an internal battery, and when the battery is low, the user plugs the communication device to an alternating current (AC) outlet or car cigarette lighter adaptor to charge the battery to operate the mobile communication device. Unfortunately, this method is not practical. For example, when the mobile communication device battery is low and the user has no access to the AC outlet or to a car cigarette lighter adaptor to charge the battery, the mobile communication device becomes useless.

In some cases, the mobile communication devices are used in applications where the mobile communication device is required to be securely attached to a person such as an offender. In those cases, when the power for the internal battery becomes low, the offender will be stranded for at least 3 hours near an AC outlet or to a vehicle cigarette lighter adapter to charge the internal battery. In the cases where the offender is located in an area where there is no AC outlet or car cigarette lighter adaptor to charge the tracking device battery, the offender's mobile communication device becomes un operative and the offender falsely will be in a violation condition.

Recently, there have been new improved methods used to overcome this problem. For example, when the power for the internal battery is low, the user can plug an external detachable battery to supply power to electronic circuitry of the mobile communication device, and charge the internal battery. This places the external detachable battery under a high current discharge condition, by supplying power to charge the internal battery and simultaneously supplying power to the electronic circuitry. Furthermore, the current drain will be high, when the mobile communication device initiates an outgoing call, because the high current is consumed from the battery. Additionally, the higher current battery discharge condition will result in a shorten life for the battery. Moreover, the use of such teaching cannot provide a secure operation of the mobile communication device at all times. For example, when the internal battery becomes exhausted and does not retain power or charge, the mobile communication device becomes un-operative and useless, e.g., when the external battery is disconnected for purpose of charging.

U.S. Pat. No. 7,804,412 ("Derrick") discusses the use of a tracking communication device securely attached to the user. For instance, in Derrick, the internal battery is within the housing, and a detachable battery re-movably secured to the housing. The detachable battery provides power to the tracking communication device and simultaneously charges the single internal battery upon being secured to the tamper resistant housing. The internal battery is adapted to provide power to the tracking communication device only when the detachable battery is disconnected or depleted.

In some embodiments of the present invention, however, a communication apparatus may include two internal batteries (e.g., a first internal battery and a second internal battery), and an external detachable battery. The external detachable battery may charge the first internal battery only, and the first internal battery may supply power to the mobile communication apparatus and charge the second internal battery. The detachable battery in certain embodiments does not provide power to the electronic circuitry of the mobile communication apparatus. Certain embodiments may include a battery condition detection circuitry configured to control a battery charging circuitry and activate a signaling circuitry when the condition of the first internal battery is at a low threshold point. For example, the user may attach the external detachable battery to charge the first internal battery, activating the signaling circuitry since the first internal battery, during charge procedure, does not have sufficient charge. The battery condition detection circuitry is further configured to determine if the first internal battery has sufficient charge to operate the electronic circuitry of the mobile communication apparatus and charge the second internal battery to a predefined power level for a predefined period of time.

Therefore, it is an objective of the present invention to utilize a first internal battery and a second internal battery to provide power to the electronic circuitry of the mobile communication apparatus, and to use a detachable battery or other attachable wireless power source to charge the first internal battery. It is also an objective of the present invention to use the 1 st internal battery to provide power to the electronic circuitry of the mobile communication apparatus and charge the second internal battery. In some embodiments, when the detachable battery charges the first internal battery, the detachable battery does not supply power to the electronic circuitry. Instead, the second internal battery may provide power to the electronic circuitry while the detachable battery is charging the first internal battery. And, in certain embodiments, when the first internal battery is charging the second internal battery, the first internal battery may provide power to the electronic circuitry. This way, the life of the detachable battery, and the life of the first internal battery and the second internal battery, is prolonged. Also, by using the first internal battery and the second internal battery after receiving a low battery detection signaling device warning, this will prolong the usage life of the first internal battery and the second internal battery.

Certain embodiments may include a first internal and second internal low battery detection circuitry and a battery charging circuitry, which upon detecting a first internal low battery condition, power from the detachable battery is used to charge the first internal battery while the mobile communication apparatus is powered by the second internal battery. Also, in certain embodiments, the first internal battery may automatically charge the second internal battery while the mobile communication apparatus is powered by the first internal battery. And, the mobile communication apparatus may generate alert signal(s) to the user upon detection of a low battery condition for the user to attach or insert a detachable battery, or use an external wireless power source to charge the low first internal battery. In some further embodiments, the mobile communication apparatus may include a processor to broadcast a signal to a monitoring station when the battery level of the second internal battery is low, i.e., when second internal battery condition is nearing to or becomes exhausted. In addition, the mobile communication apparatus may generate an alerting signal to the user when the detachable battery or external wireless power source becomes low or disconnected.

In another embodiment, the mobile communication apparatus may be securely attached to a person (or user) to be monitored, and include a housing. The housing may include a first internal battery and a second internal battery, each may provide power to the electronic circuitry. Both first internal battery and second internal battery are located within the housing, for example. The detachable battery may be attached to or inserted into the housing. The detachable battery may charge the first internal battery upon being attached to or inserted into the housing. In addition, the first internal battery or the second internal battery may provide power to the mobile communication apparatus when the detachable battery is disconnected or depleted, and the first internal battery may charge the second internal battery while simultaneously providing power to the electronic circuitry. The mobile communication apparatus may also include a processor with a low first internal and a second internal battery detection circuitry, a detachable low battery detection circuitry, a battery charging circuitry to charge both first internal battery and second internal battery, and a battery switching circuitry to switch from the first internal battery to the second internal battery providing power to the electronic circuitry when the external battery is charging the first internal battery.

In yet another embodiment, mobile communication apparatus may include an electronic circuitry powered by the first internal battery, and when the first internal battery condition is low, the processor detects the low battery condition and the processor accordingly adapts the detachable battery to charge the first internal battery, and the processor battery switching circuitry adapts the second internal battery to provide power to the electronic circuitry.

When the second internal battery condition is low, the processor detects the low battery condition and the processor accordingly adapts the first internal battery to automatically charge the second internal battery, and the processor battery switching circuitry adapts the first internal battery to provide power to the electronic circuitry.

In some embodiments, the electronic circuitry is powered by the first internal battery, and when the first internal battery becomes low, the processor detects the low battery condition and the processor initiates the signaling device to produce an alert signal to notify the user to attach or insert a charged up detachable battery to charge the internal first battery.

And, when the second internal battery becomes low, the processor detects the second internal low battery condition and initiates the signaling device to produce an alert signal to notify the user to attach or insert a charged detachable battery to charge the first internal battery, and after detecting the first internal battery fully charged condition, the processor stops the detachable battery from charging the first internal battery, and connects the first internal battery to charge the second internal battery.

And, in some further embodiments, a signaling device may initiate an alert signal to notify the user that the detachable battery has reached a predetermined low power level. This way, the user may recharge the detachable battery by using an external charger.

And, in some additional embodiments, mobile communication apparatus may include a positioning locator, such as a GPS receiver, or cellular, or radio frequency (RF) radio transceiver, to coordinate the location of the mobile communication apparatus, and use a cellular, satellite or RF communication module to communicate with a monitoring station. The mobile communication apparatus, in certain embodiments, may have a tamper detection housing attached to a person or an object, and also, a removal or tamper detection circuitry, or a tamper detection strap, attaching the mobile communication apparatus to a person or an object, to securely locate individuals or objects under surveillance. Some embodiments may provide the user with the ability to charge the first internal battery to charge the second internal battery in remote locations, and provide the first internal battery or the second internal battery to supply power to the electronic circuitry, when the first internal battery is being charged by a detachable battery, and when the second internal battery is providing power to the electronic circuitry.

SUMMARY OF THE INVENTION

Some embodiments generally pertain to a mobile communication apparatus securely attached to a person to be monitored. The mobile communication apparatus may include a first internal battery and a second internal battery to provide power to the electronic circuitry, and a detachable battery to charge the first internal battery. In some embodiments, when the first internal battery is charged by the detachable battery, the mobile communication apparatus is operative by the power from the second internal battery. And, when the second internal battery is charged by the first internal battery, the mobile communication apparatus is operative by the power from the first internal battery. The mobile communication apparatus may include a low battery detection circuitry in some embodiments to detect the whether a low battery condition of the first internal battery and/or the second internal battery and activate a signaling circuitry to warn the user to charge the first internal battery with an external detachable battery. The mobile communication apparatus may transmit the second internal battery detection to a monitoring station in certain embodiments.

The mobile communication apparatus may include a positioning locator receiver in some embodiments to determine the location of the mobile communication apparatus and to wirelessly transmit the location information to a monitoring station. The mobile communication apparatus may also include a tamper detection circuitry.

DETAILED DESCRIPTION OF THE INVENTION

Figure 1:
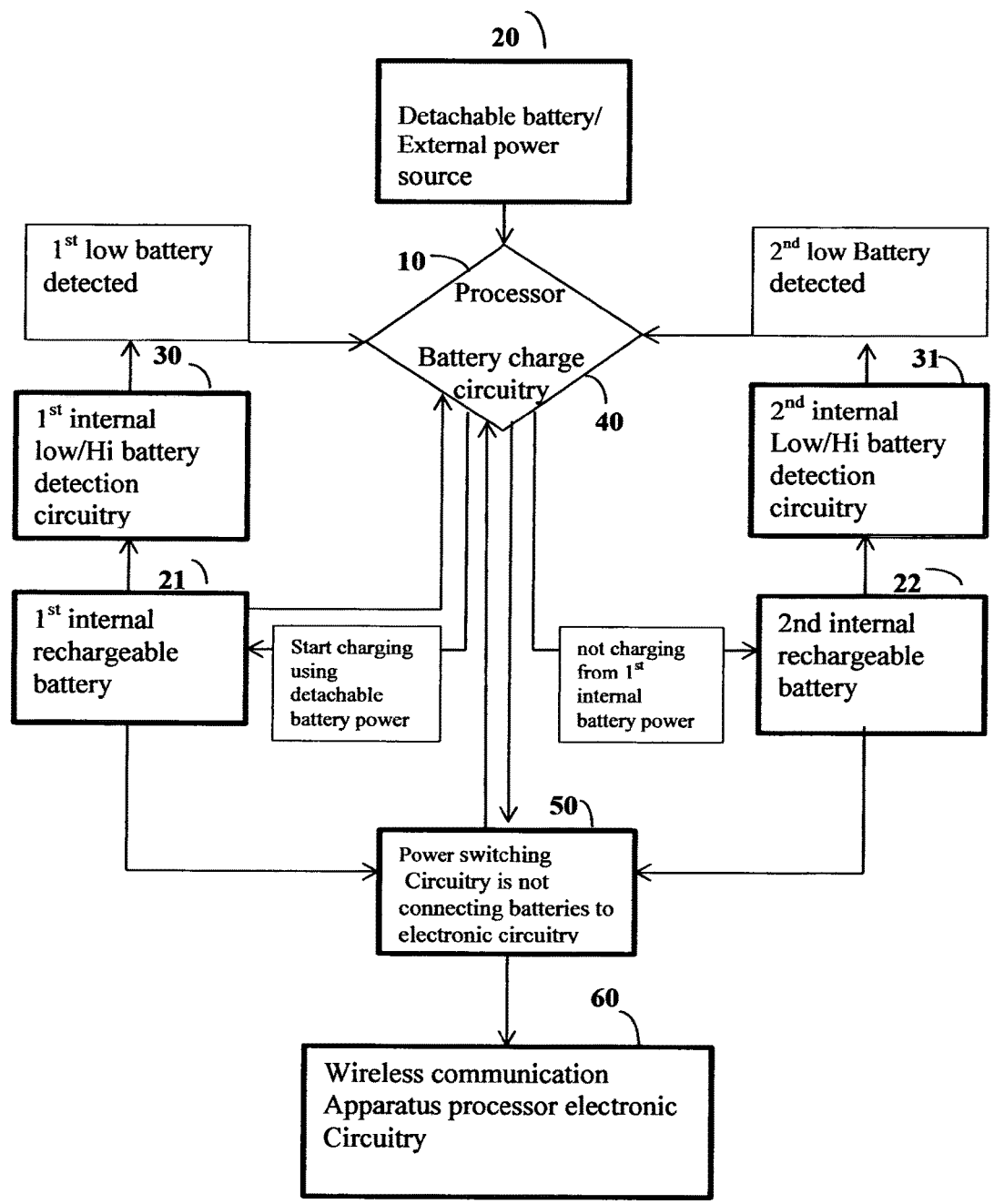
FIG. 1 is a block diagram illustrating a flow chart for charging, using the battery charging circuitry, a first internal battery from a detachable battery, when the first internal battery is low or empty, and when the second internal battery is low condition or empty, the battery charging circuitry not using the first internal battery power to charge the second internal battery, and the power switching circuitry not supplying power to the electronic circuitry, according to an embodiment of the present invention.
Figure 8:
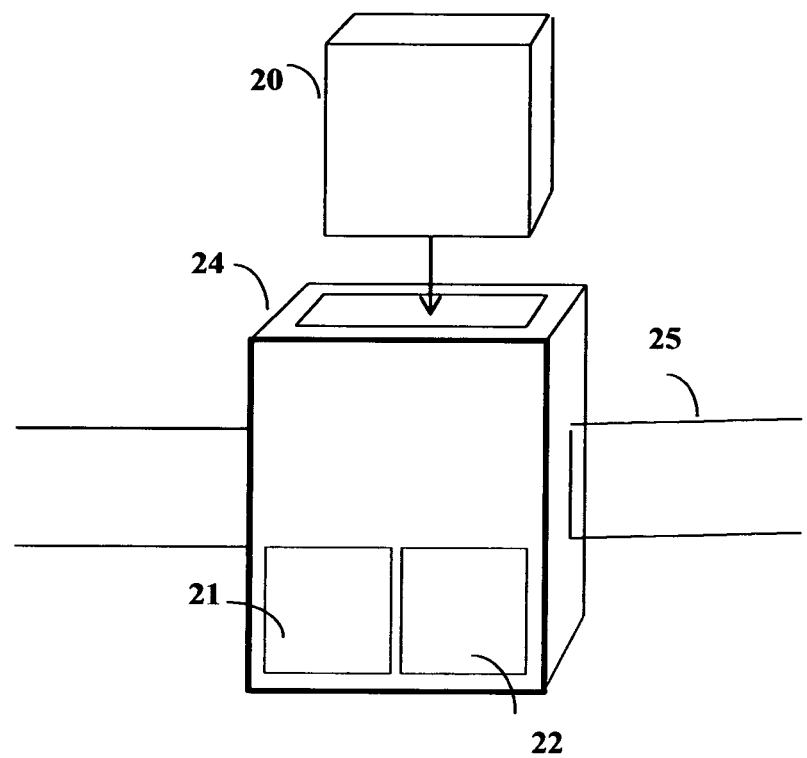
FIG. 8 illustrates a mobile communication apparatus illustrates two internal batteries and one detachable battery securely attached by a strap to a person or subject to be monitored having a tamper detection housing and a removal tamper detection strap 25, according to an embodiment of the present invention.
Figure 9:
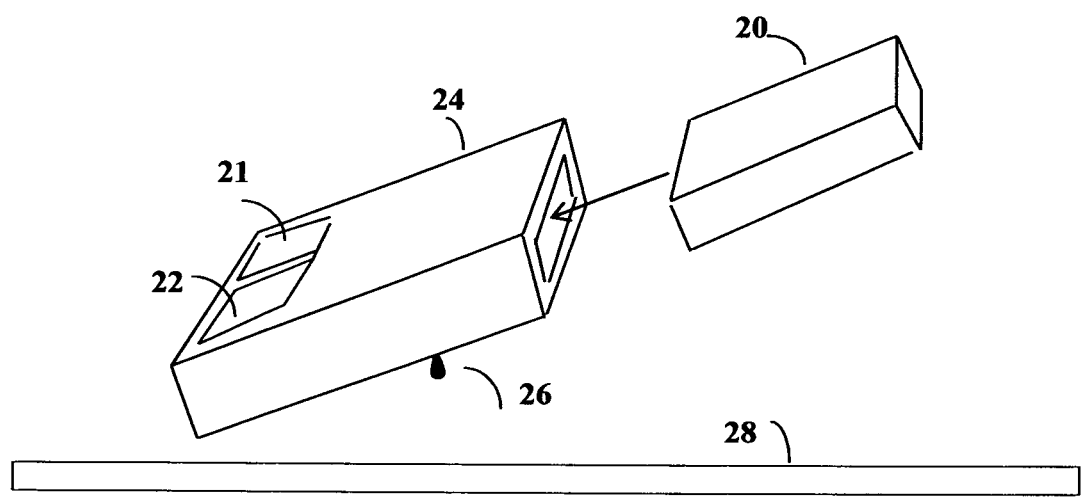
FIG. 9 illustrates a mobile communication apparatus includes two internal batteries and one detachable battery securely attached to a person or subject 28 to be monitored having a tamper detection housing and a removal tamper detection sensor 26, according to an embodiment of the present invention.

FIGS. 8 and 9 illustrate a mobile communication apparatus that includes a housing 24 for a first internal battery 21 and a second internal battery 22. As shown in FIG. 1, for example, both first internal battery 21 and second internal battery 22 are low or in empty condition, and the power switching circuitry 50 is not connecting first internal battery 21 and second internal battery 22 to electronic circuitry 60 and processor 10. Thus, first internal battery 21 and second internal battery 22 are not supplying power to electronic circuitry 60 and processor 10. In this embodiment, battery charging circuitry 40 causes detachable battery 20 to charge first internal battery 21, and battery charging circuitry 40 is not using power from the first internal battery 21 to charge second internal battery 22.

Figure 2:
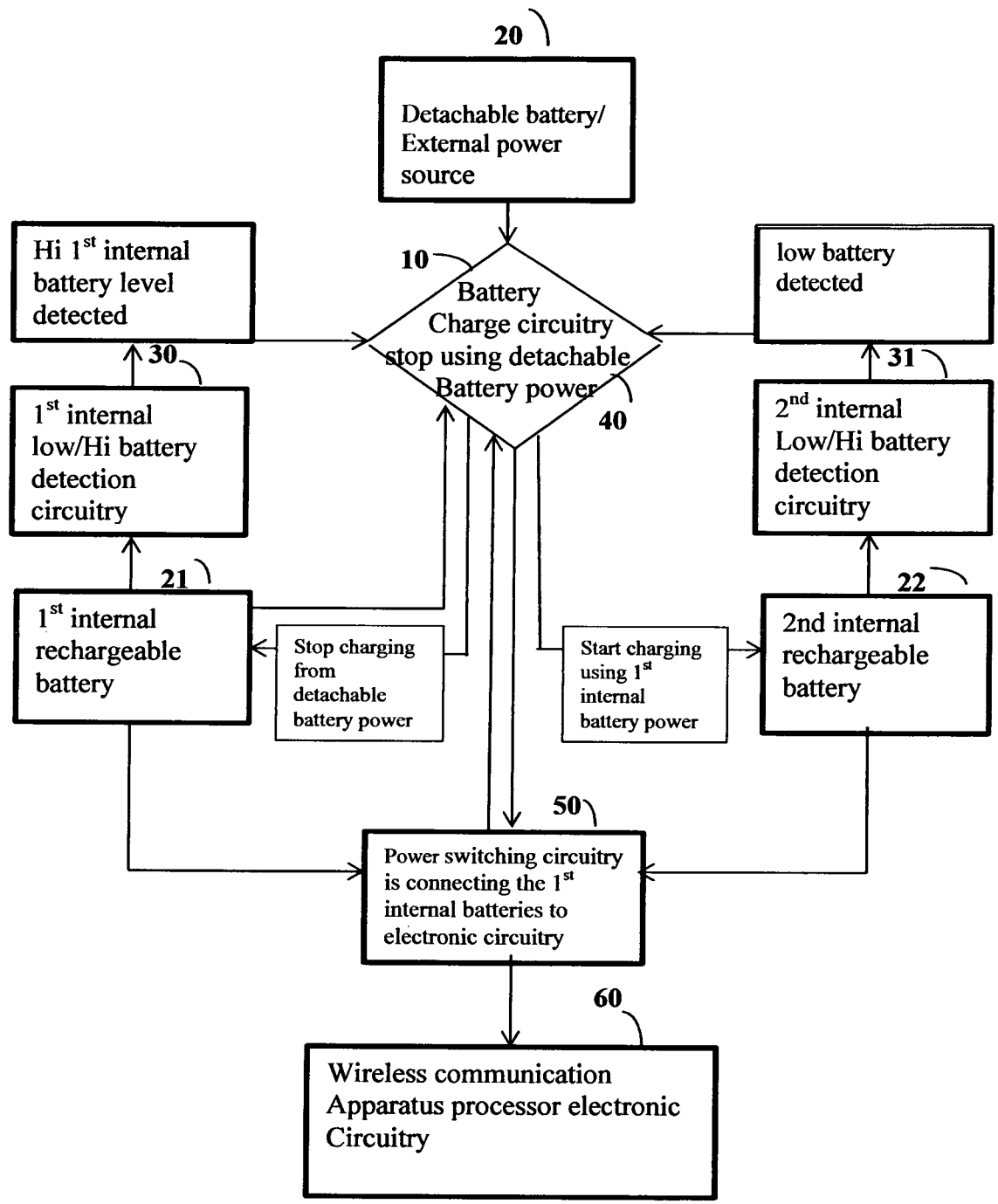
FIG. 2 is a block diagram illustrating a flow chart for the battery charging circuitry to start using power from the first internal battery to charge the second internal battery and to stop charging the first internal battery, when the first internal battery is fully charged, and the second internal battery is low condition or empty, with the power switching circuitry supplying power to the electronic circuitry from the first internal battery, according to an embodiment of the present invention.

When, for example, first internal battery 21 becomes fully charged, processor 10, from first internal low/high (or hi) battery detection circuitry 30, detects first internal battery 21 high level charged condition, processor 10 sends a signal to battery charging circuitry 40 to stop charging the first internal battery 21, and start charging second internal battery 22 using power from first internal battery 21. See, for example, FIG. 2. And, power switching circuitry 50 may provide power from first internal battery 21 to the electronic circuitry 60.

Figure 3:
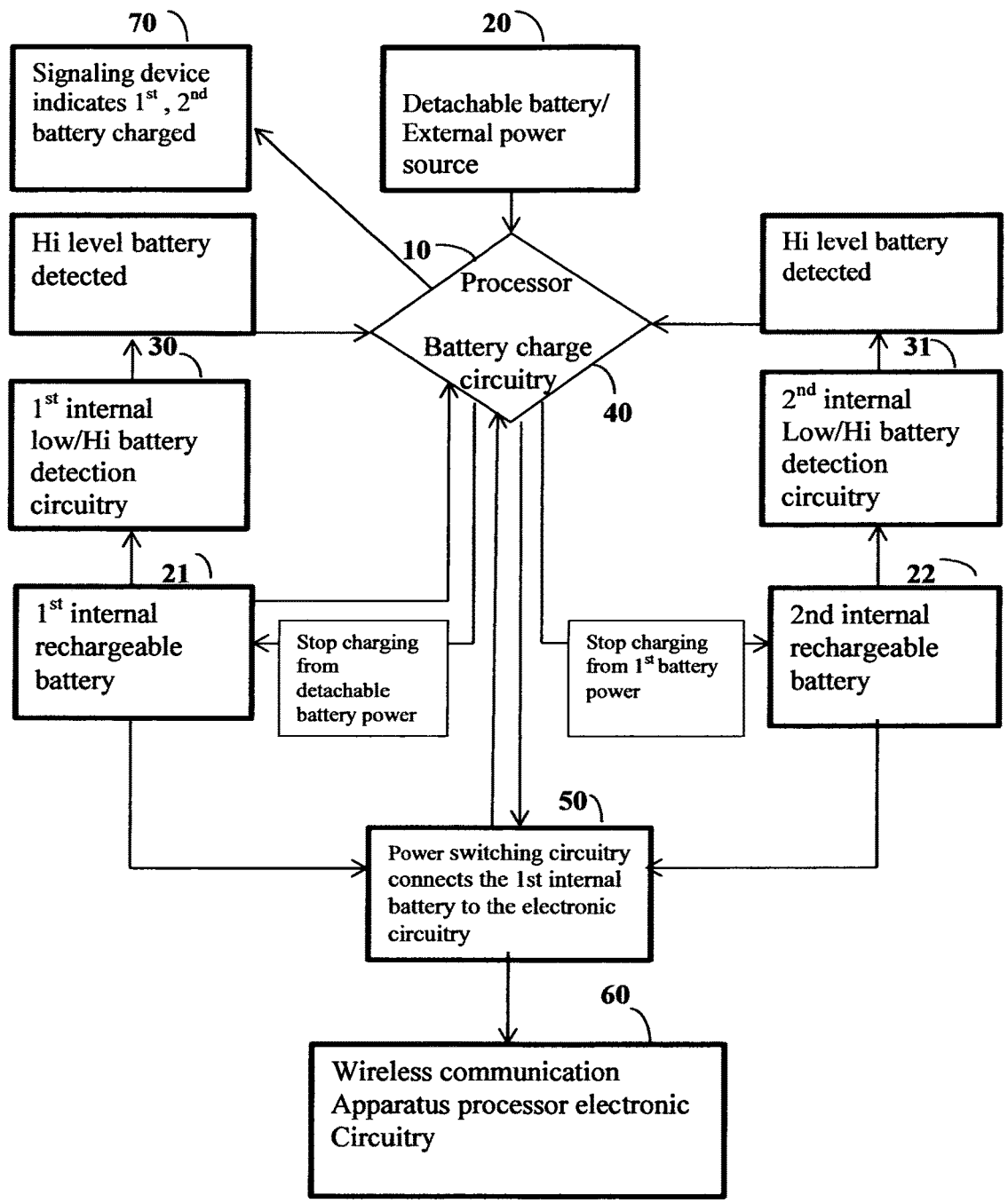
FIG. 3 is a block diagram illustrating a flow chart for the power switching circuitry to supply power from the first internal battery to the electronic circuitry, when the first internal battery and the second internal battery are fully charged, and the battery charging circuitry is not charging the first internal battery and the second internal battery, according to an embodiment of the present invention.

As shown in FIG. 3, when first internal battery 21 and second internal battery 22, detection circuitry 30, 31 detects a high condition for first internal battery 21 and second internal battery 22, signaling device 70 indicates first internal battery 21 and second internal battery 22 are fully charged, and power switching circuitry 50 provides power from the first internal battery 21 to electronic circuitry 60, and supplies power to the battery charger processor circuitry. This way, when the user removes detachable battery 20 from charging, the first internal battery 21 will provide power to the processor 10.

Figure 4:
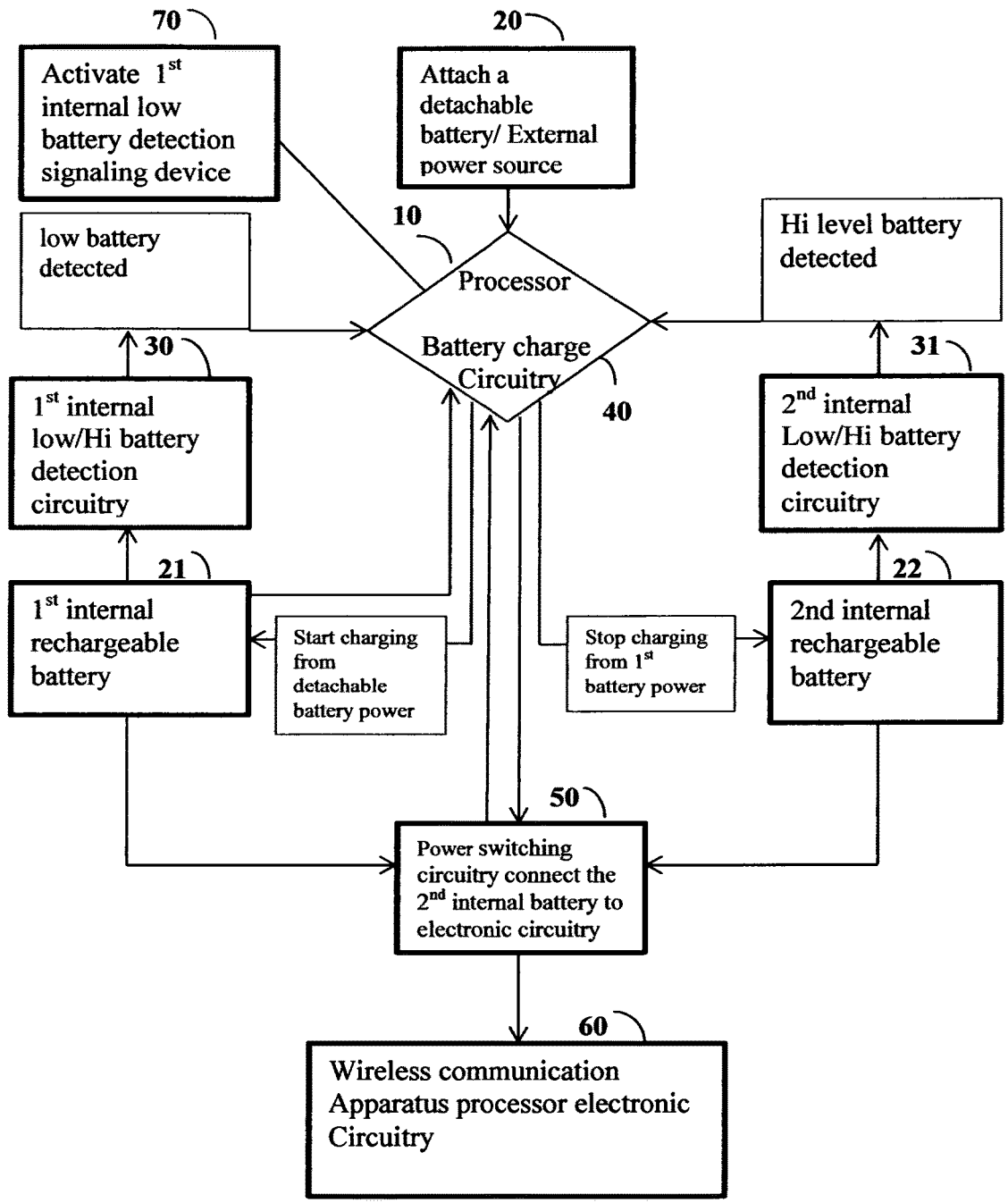
FIG. 4 is a block diagram illustrating a flow chart for the battery charging circuitry to activate low battery signaling using the detachable battery power to start charging the first internal battery, while the power switching circuitry is providing power from the second internal battery to the electronic circuitry, when the low battery detection circuitry detects that the first internal has a low battery condition, according to an embodiment of the present invention.

FIG. 4 shows that when the first internal battery 21 condition becomes low, and when detection circuitry 30 detects the low battery condition, processor 10 activates the first internal low battery detection signaling device 70 for the user to attach a detachable battery 20 for the battery charging circuitry 40 to start charging first internal battery 21. The processor 10 may activate power switching circuitry 50 to provide power from second internal battery 22 to electronic circuitry 60 and to battery charging circuitry 40, and to stop charging the second internal battery 22.

Figure 5:
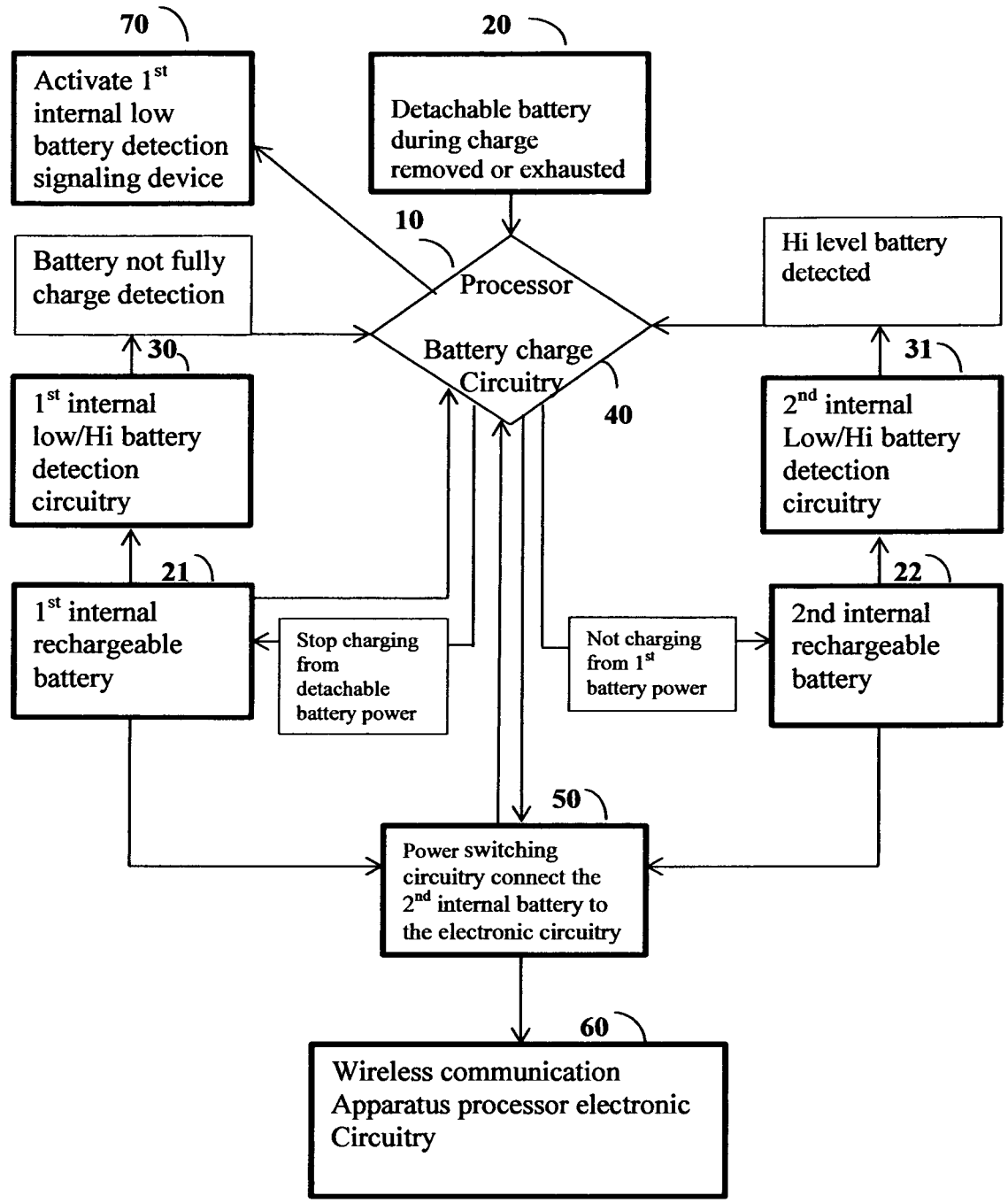
FIG. 5 is a block diagram illustrating a flow chart for the battery charging circuitry to stop charging the first internal battery since the detachable battery during charging process is removed or becomes exhausted, and the processor activates the first internal low battery condition signaling device, while the power switching circuitry is providing power from the second internal battery to the electronic circuitry, according to an embodiment of the present invention.

FIG. 5 shows, when battery charging circuitry 40 charging first internal battery 21, using power from detachable battery 20, during charging process, and if detachable battery 20 becomes exhausted or removed by the user, prior to first internal battery 21 becoming fully charged, then first internal battery condition detection circuitry 30 may detect the battery charge capacity and send a signal to processor 10. Processor 10 may determine that the charging process is no longer in progress, and accordingly, initiate first internal low battery detection signaling device 70 for the user to insert a fully charged detachable battery 20, so battery charging circuitry 40 may continue charging first internal battery 21 until first internal battery 21 reaches a predefined level charge capacity.

Figure 6:
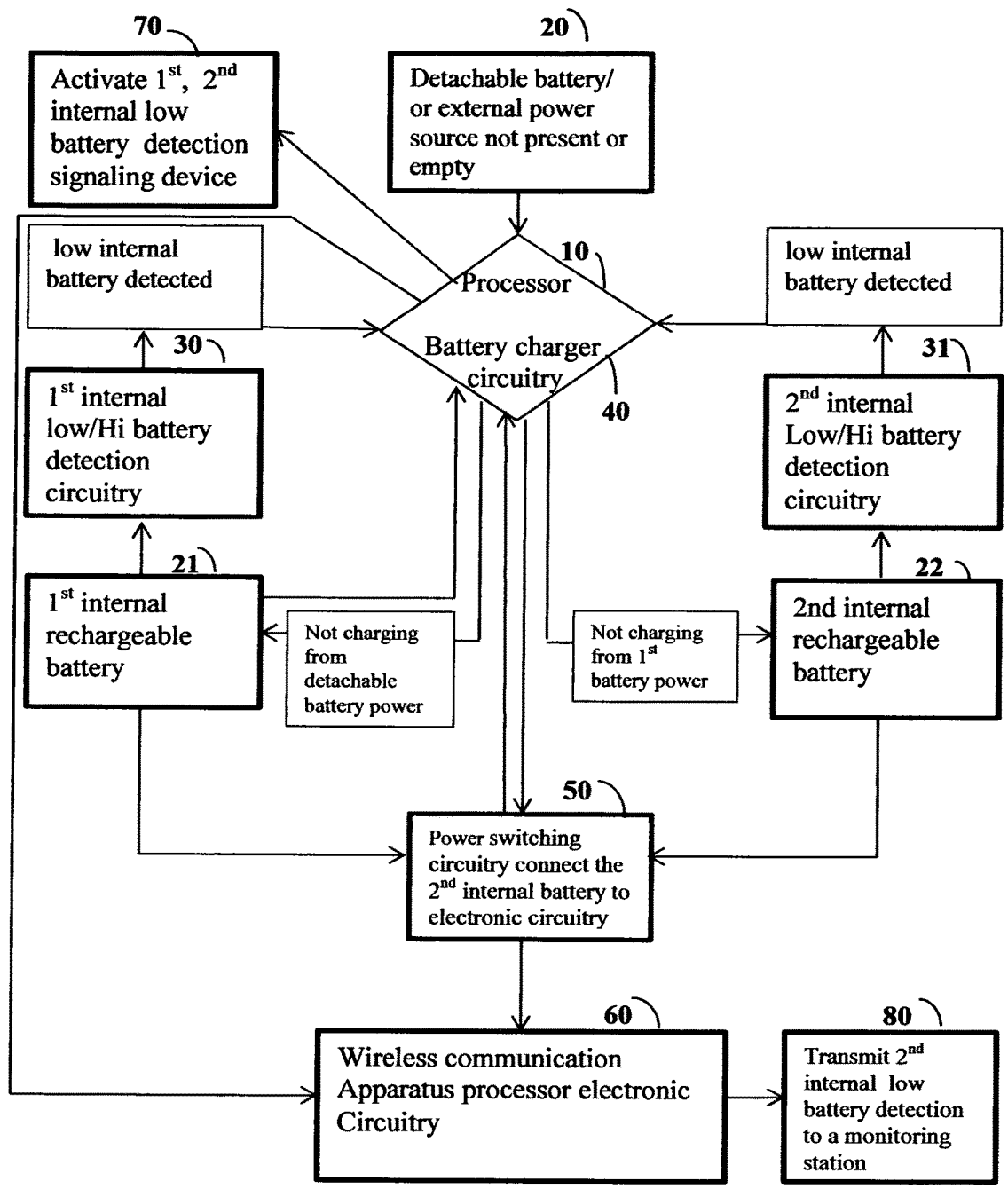
FIG. 6 is a block diagram illustrating a flow chart for processor activating the first internal and second internal low detection signaling device, when the detachable battery is not present or empty, the battery charging circuitry is not able to charge the first internal battery and second internal battery, and the second internal battery is low, while power switching circuitry providing power from the second internal battery to the electronic circuitry and the electronic circuitry transmitting a second internal low battery condition detection signal to a monitoring station, according to an embodiment of the present invention.

FIG. 6 shows an apparatus alerting circuitry. In this embodiment, when internal battery detection circuitry 30 detects a low first internal battery 21, and a second internal low battery condition, processor 10 may activate alerting circuitry 70, and generate alert signal for the user to insert a charged up detachable battery 20 for battery charging circuitry 40 to charge the first internal low battery 21. Furthermore, at a predetermined time, when the user does not attach a charged up detachable battery 20, processor 10 may send a signal to the communication apparatus electronic circuitry 60 to transmit a signal to a monitoring station 80.

Figure 7:
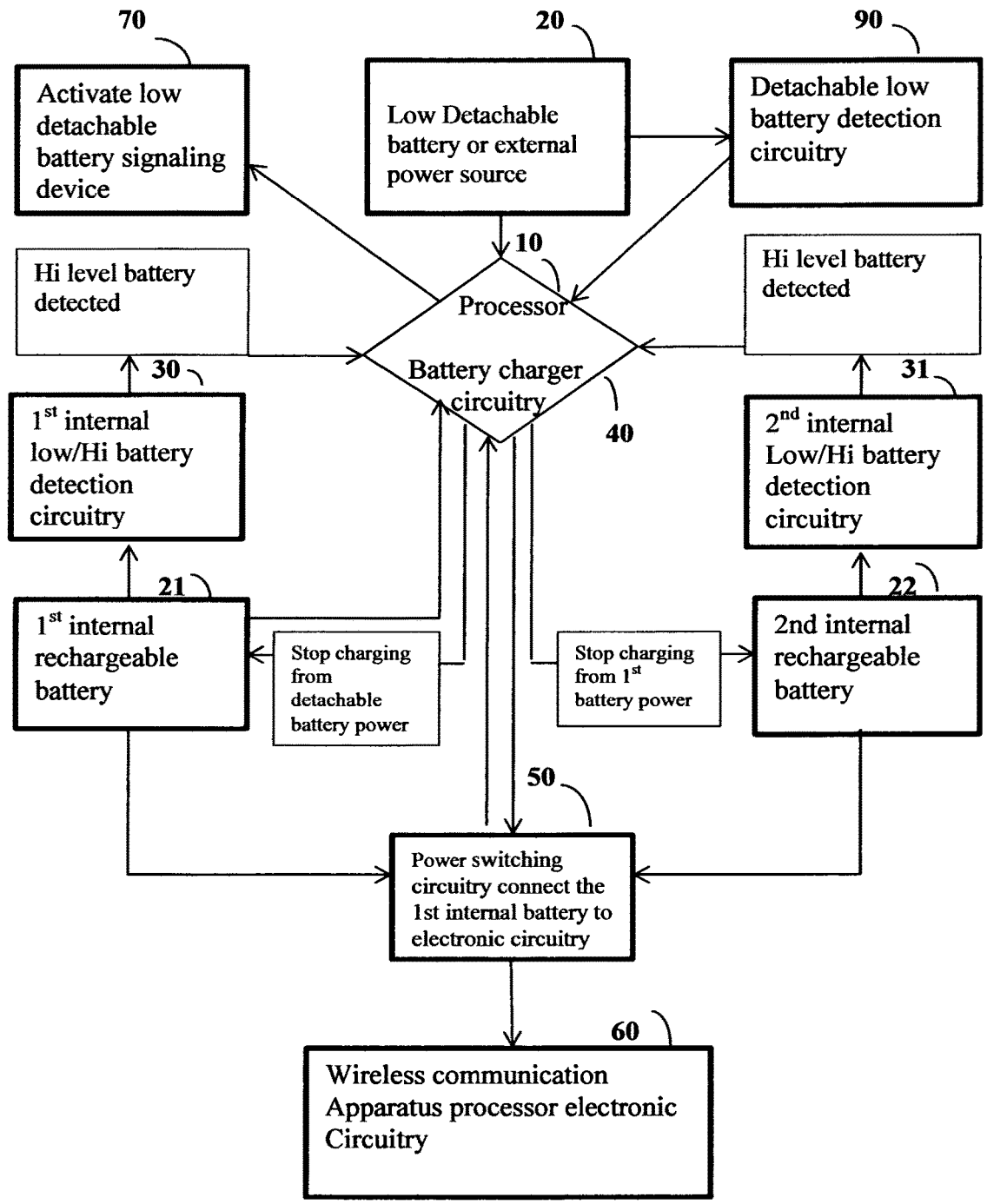
FIG. 7 is a block diagram illustrating a flow chart for the low detachable battery detection circuitry detecting low detachable battery condition, and the power switching circuitry connected to first internal battery to provide power to the electronic circuitry, when the detachable battery is low or empty, and when the battery charging circuitry is not charging the first internal battery and the second internal battery, the processor activating the detachable low battery detection signaling device circuitry, according to an embodiment of the present invention.

In FIG. 7, a low battery detection circuitry 90 may detect the detachable battery 20 condition, and low battery detection signaling device 70 may initiate a distinct alert signal(s) to notify the user that the detachable battery 20 has reached a predetermined low battery power level, e.g., at 200 ma capacity remaining. This may cause battery charging circuitry 40 to stop charging the first internal battery for the user to detach and charge the detachable battery 20 by the use of an external charger, while the power switching circuitry 50 provides power to the electronic circuitry of the mobile communication apparatus and to the battery charge processor circuitry from second internal battery 21. The internal low battery detection signaling device 70 may initiate alert signal(s) for the user to re-attach or insert a charged up detachable battery 20 to the housing. This may occur when first internal battery 21 or second internal battery 22 becomes in low battery condition.

The invention claimed is:

1. Automatic dual battery charger mobile communication apparatus, comprising:
a first internal battery and a second internal battery, wherein the first internal battery charges the second internal battery, and concurrently, provides power to electronic circuitry of the apparatus;
a detachable battery configured to charge the first internal battery;
a housing comprising the first internal battery and a second internal rechargeable battery, the detachable battery attached to, or inserted into, the housing to charge the first internal battery;
a processor comprising a low battery detection circuitry configured to detect low battery condition of the first internal battery and the second internal battery;
battery charging circuitry configured to charge the first internal battery and the second internal battery, and a power switching circuitry configured to supply power from the first or second internal battery to the apparatus electronic circuitry;
low battery detection signaling circuitry; and
radio frequency (RF) transceiver circuitry configured to establish RF communication with other communication devices through a wireless communication network, wherein
when the first internal battery provides power to the electronic circuitry, the battery charging circuitry is configured to obtain power from the first internal battery and charge the second internal battery, and
the low battery detection circuitry, upon detecting of a low battery condition for the first internal battery, causes the processor to activate the low battery detection signaling circuitry notifying the user to attach the detachable battery to or into the housing allowing for the battery charging circuitry to obtain power from the detachable battery to charge the first internal battery, and concurrently, the power switching circuitry is configured to provide power from the second internal battery to the electronic circuitry.

2. The apparatus of claim 1, further comprising:
a positioning locator receiver configured to receive coordinate signals from global positioning system (GPS) satellites to coordinate the location of the apparatus, and to transmit the received coordinate signals to a monitoring station, or
the RF transceiver circuitry receives signals from cell/radio towers to coordinate the location of the apparatus, and transmit the received coordinate signals to the monitoring station.

3. The apparatus of claim 2, further comprising:
a tamper detection housing securely attached to a subject to be monitored, wherein
the tamper detection housing is configured to detect housing tamper or removal of the housing from the subject to be monitored, and the processor of the apparatus, in response to detecting a tamper condition, causes the RF transceiver circuitry to transmit at least one signal to the monitoring station, wherein the at least one signal comprises an identification of the apparatus, the identification of the apparatus and a condition of the apparatus, the identification of the apparatus and positioning location information of the apparatus, or the identification of the apparatus, the condition of the apparatus, and the positioning location information of the apparatus.

4. The apparatus of claim 2, further comprising:
a housing securely attached to a subject to be monitored with a removal tamper sensor, by a removal tamper detection strap, or both, wherein
the processor of the apparatus, in response to detecting the tamper condition, causes the RF transceiver circuitry to transmit at least one signal to a monitoring station, the at least one signal comprising an identification of the apparatus, the identification of the apparatus and a condition of the apparatus, the identification of the apparatus and positioning location information of the apparatus, or the identification of the apparatus, the condition of the apparatus, and the positioning location information of the apparatus.

5. The apparatus claim 1, wherein
when the low battery detection circuitry detects that the first internal battery is at a preset low level condition, the battery charging circuitry automatically charges the first internal battery when the detachable battery is attached to the apparatus.

6. The apparatus of claim 1, wherein
the low battery detection circuitry, in response to detecting a low condition for the second internal battery, causes the processor to transmit one or more signal to a monitoring station indicative that the second internal battery is in the low condition.

7. The apparatus of claim 1, wherein
when the low battery detection circuitry detects that the first internal battery or second internal battery is not charging, the processor activates the low battery detection signaling circuitry to notify the subject to be monitored that the first internal battery or the second internal battery is exhausted and not holding charge, or transmit a signal to a monitoring station indicating that the first internal battery or the second internal battery is exhausted and not holding charge, or both.

8. The apparatus of claim 1, wherein,
when the detachable battery is low, the low battery detection circuitry detects a low condition of the detachable battery and activates the low battery detecting signaling circuitry indicating to the user that the detachable battery has reached a set low power level, instructing the user to replace or detach and charge the detachable battery.

9. The apparatus of claim 1, wherein
when the battery charging circuitry obtains power from the detachable battery to charge the first internal battery, and when the detachable battery is exhausted or removed prior to fully charging the first internal battery, the processor activates the low battery detection signaling circuitry to alert the user that the detachable battery, the first internal battery, or both is not fully charged; and for the user to insert a charged detachable battery to charge the first internal battery.

* * * * *